United States Patent
Zhang et al.

(10) Patent No.: US 9,437,205 B2
(45) Date of Patent: Sep. 6, 2016

(54) METHOD, APPLICATION, AND DEVICE FOR AUDIO SIGNAL TRANSMISSION

(71) Applicant: Tencent Technology (Shenzhen) Company Limited, Shenzhen (CN)

(72) Inventors: Xiaolong Zhang, Shenzhen (CN); Yuan Zhao, Shenzhen (CN); Ganrong Yang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 189 days.

(21) Appl. No.: 14/108,230

(22) Filed: Dec. 16, 2013

(65) Prior Publication Data

US 2014/0337038 A1  Nov. 13, 2014

Related U.S. Application Data

(63) Continuation of application No. PCT/CN2013/085913, filed on Oct. 24, 2013.

(30) Foreign Application Priority Data

May 10, 2013 (CN) .......................... 2013 1 0172926

(51) Int. Cl.
G10L 19/22  (2013.01)
H04L 12/58  (2006.01)
G10L 19/24  (2013.01)

(52) U.S. Cl.
CPC ............... *G10L 19/22* (2013.01); *G10L 19/24* (2013.01); *H04L 12/5845* (2013.01)

(58) Field of Classification Search
CPC ...... G10L 19/002; G10L 19/22; G10L 19/24
See application file for complete search history.

(56) References Cited

U.S. PATENT DOCUMENTS 6,330,532 B1 * 12/2001 Manjunath ............ G10L 19/002
704/200
6,604,070 B1 * 8/2003 Gao ....................... G10L 19/167
704/222

(Continued)

FOREIGN PATENT DOCUMENTS

CN  1411256 A  4/2003
CN  101394585 A  3/2009

(Continued)

OTHER PUBLICATIONS

3GPP TS 26.304 V7.0.0, "3rd Generation Partnership Project; Technical Specification Group Services and System Aspects; Extended Adaptive Multi-Rate-Wideband (AMR-WB+) codec; Floating-point ANSI-C code", Mar. 2007.*

(Continued)

*Primary Examiner* — Brian Albertalli
(74) *Attorney, Agent, or Firm* — Morgan, Lewis & Bockius LLP

(57) ABSTRACT

The current invention discloses methods, applications, and devices for audio transmission from a mobile terminal. After receiving an audio signal transmission request from a user, the mobile terminal may initiate a recording session to record audio signals into audio frames. During the recording session, the terminal may adjust the audio codecs used for encoding the audio frames based on the workload and the performance of the terminal. By measuring and evaluating the encoding time, the terminal may change between using a floating-point AMR audio codec and a fixed-point AMR audio codec. The encoded audio frames are transmitted to a remote server. The current invention provides a flexible and efficient approach for audio signal encoding and transmission, balancing signal integrity and encoding speed at the same time.

16 Claims, 7 Drawing Sheets

(56) References Cited

U.S. PATENT DOCUMENTS

| | | | | |
|---|---|---|---|---|
| 7,281,053 B2* | 10/2007 | Mantegna | | G10L 19/18 370/516 |
| 7,630,308 B1* | 12/2009 | Loher | | H04L 65/80 370/230.1 |
| 7,873,074 B1* | 1/2011 | Boland | | H04L 12/14 370/468 |
| 9,025,504 B2* | 5/2015 | Bruhn | | H04W 28/065 370/310 |
| 2002/0184373 A1* | 12/2002 | Maes | | G10L 15/30 709/228 |
| 2003/0063574 A1 | 4/2003 | Virolainen | | |
| 2005/0010405 A1* | 1/2005 | Shlomot | | G10L 15/285 704/229 |
| 2005/0240415 A1* | 10/2005 | Wiese | | H04B 1/665 704/500 |
| 2006/0094472 A1* | 5/2006 | Othmer | | G10L 19/20 455/563 |
| 2007/0223660 A1* | 9/2007 | Dei | | G10L 19/24 379/88.13 |
| 2008/0103765 A1* | 5/2008 | Lakaniemi | | G10L 19/22 704/222 |
| 2008/0120098 A1* | 5/2008 | Makinen | | G10L 19/22 704/222 |
| 2009/0006104 A1* | 1/2009 | Sung | | G10L 19/22 704/500 |
| 2009/0106617 A1* | 4/2009 | Katis | | H04L 12/581 714/748 |
| 2010/0088102 A1* | 4/2010 | Urata | | G10L 21/04 704/500 |
| 2011/0060595 A1* | 3/2011 | Trainor | | G10L 19/22 704/500 |
| 2011/0257964 A1* | 10/2011 | Rathonyi | | H04J 3/0697 704/201 |
| 2012/0028642 A1* | 2/2012 | Schliwa-Bertling | | C12N 5/0686 455/436 |
| 2012/0120813 A1* | 5/2012 | Johansson | | G10L 19/22 370/249 |
| 2012/0296656 A1* | 11/2012 | Smyth | | G10L 19/22 704/500 |
| 2012/0323568 A1* | 12/2012 | Bruhn | | G10L 19/12 704/201 |
| 2013/0321702 A1* | 12/2013 | Ruan | | H03M 7/00 348/515 |
| 2014/0067405 A1* | 3/2014 | Patel | | G10L 19/00 704/500 |
| 2014/0142955 A1* | 5/2014 | Alsina | | G10L 19/24 704/500 |
| 2014/0180458 A1* | 6/2014 | Nayak | | G06F 17/3074 700/94 |
| 2014/0236587 A1* | 8/2014 | Subasingha | | G10L 19/12 704/219 |

FOREIGN PATENT DOCUMENTS

| | | |
|---|---|---|
| CN | 101588284 A | 11/2009 |
| CN | 102624874 A | 8/2012 |
| EP | 2043336 A2 | 4/2009 |

OTHER PUBLICATIONS

Lutzky, Manfred, et al. "A guideline to audio codec delay." AES 116th convention, Berlin, Germany. 2004.*

Ledger, Dan, and John Tomarakos. "Using the low cost, high performance ADSP-21065L digital signal processor for digital audio applications." Norwood. DSP Applications Group, Analog Devices (1998).*

Tencent Technology, ISR, PCT/CN2013/085913, Feb. 27, 2014, 3 pgs.

Tencent Technology, Written Opinion, PCT/CN2013/085913, Feb. 27, 2014, 5 pgs.

Tencent Technology, IPRP, PCT/CN2013/085913, Nov. 10, 2015, 6 pgs.

* cited by examiner

METHOD, APPLICATION, AND DEVICE FOR AUDIO SIGNAL TRANSMISSION

RELATED APPLICATIONS

This application is a continuation application of PCT Patent Application No. PCT/CN2013/085913, entitled "METHOD, APPLICATION, AND DEVICE FOR AUDIO SIGNAL TRANSMISSION" filed Oct. 24, 2013, which claims priority to Chinese Patent Application No. 201310172926.4, "METHOD, APPLICATION, AND TERMINAL FOR AUDIO SIGNAL TRANSMISSION," filed May 10, 2013, both of which are hereby incorporated by reference in their entirety.

FIELD OF THE INVENTION

The present invention relates to the field of network technology, and in particular to audio technology involving methods, applications and devices for audio transmission.

BACKGROUND OF THE INVENTION

At present, recording technology is widely used in the client-side applications such as Instant Messenger (IM) and Social Networking Services (SNS). Recording technology is the basis of audio transmission, and it provides more convenient services for exchange and communication between users. In general, the conventional process of audio transmission includes: application provides a "Record" button in the chat interface; a user sends out an audio transmission request while pressing this button; the application initiates the recording program installed on the terminal, which starts recording; the recording program records audio input by users; the recording is ended when user releases the button; the recording program compiles the obtained complete audio signal data to form an audio file; the recording program loads the audio file to the application to conduct audio encoding and audio transmission. In the aforementioned process, since the compilation, encoding, and transmission of audio signals can only be conducted after the audio recording process is finished, the delay for audio transmission may be significant. Such a process cannot meet the needs of some scenarios that require swift audio transmission, making the user experience unsatisfactory regarding audio communication.

Accordingly, it is necessary and desirable to provide a new technology, so as to resolve the technical problem and improve the above-mentioned approach.

SUMMARY

The above deficiencies and other problems associated with audio encoding and transmission are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a mobile terminal. The mobile terminal may receive an audio signal transmission request from a user of the mobile terminal and initiate a recording session in a recording program to record audio signals captured by the mobile terminal into audio frames in an audio file. During the recording session, the mobile terminal may encode a respective predefined sequence of audio frames in the audio file using a first audio codec and measuring an amount of processing time associated with the encoding. If the amount of processing time associated with the encoding is less than a predefined threshold, the mobile terminal may continuously encode audio frames in the audio file using the first audio codec; and if the amount of processing time associated with the encoding is equal to or greater than the predefined threshold, the mobile terminal may encode audio frames in the audio file using a second audio codec. The mobile terminal may also transmit the encoded predefined sequence of audio frames in the audio file to a remote server.

Another aspect of the invention involves a computer system. The computer system may comprise a mobile terminal having one or more processors, memory, and one or more program modules stored in the memory and configured for execution by the one or more processors, the one or more program modules including: a receiving module configured to receive an audio signal transmission request from a user of the mobile terminal; a recording module configured to initiate a recording session in a recording program to record audio signals captured by the mobile terminal into audio frames in an audio file; an encoding module having a codec determination unit and an encoding unit, wherein: during the recording session: the encoding unit is configured to encode a respective predefined sequence of audio frames in the audio file using a first audio codec, the codec determination unit is configured to measure an amount of processing time associated with the encoding, if the amount of processing time associated with the encoding is less than a predefined threshold, the encoding unit is configured to continuously encode audio frames in the audio file using the first audio codec, if the amount of processing time associated with the encoding is equal to or greater than the predefined threshold, the encoding unit is configured to encode audio frames in the audio file using a second audio codec; and a transmission module configured to transmit the encoded predefined sequence of audio frames in the audio file to a remote server.

Another aspect of the invention involves a non-transitory computer readable storage medium having stored therein instructions, which, when executed by a mobile terminal, cause the mobile terminal to: receive an audio signal transmission request from a user of the mobile terminal; initiate a recording session in a recording program to record audio signals captured by the mobile terminal into audio frames in an audio file; during the recording session: encode a respective predefined sequence of audio frames in the audio file using a first audio codec and measure an amount of processing time associated with the encoding; if the amount of processing time associated with the encoding is less than a predefined threshold, continuously encode audio frames in the audio file using the first audio codec; if the amount of processing time associated with the encoding is equal to or greater than the predefined threshold, encode audio frames in the audio file using a second audio codec; and transmit the encoded predefined sequence of audio frames in the audio file to the remote server.

Some embodiments may be implemented on either the terminal side or the server side of a terminal-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
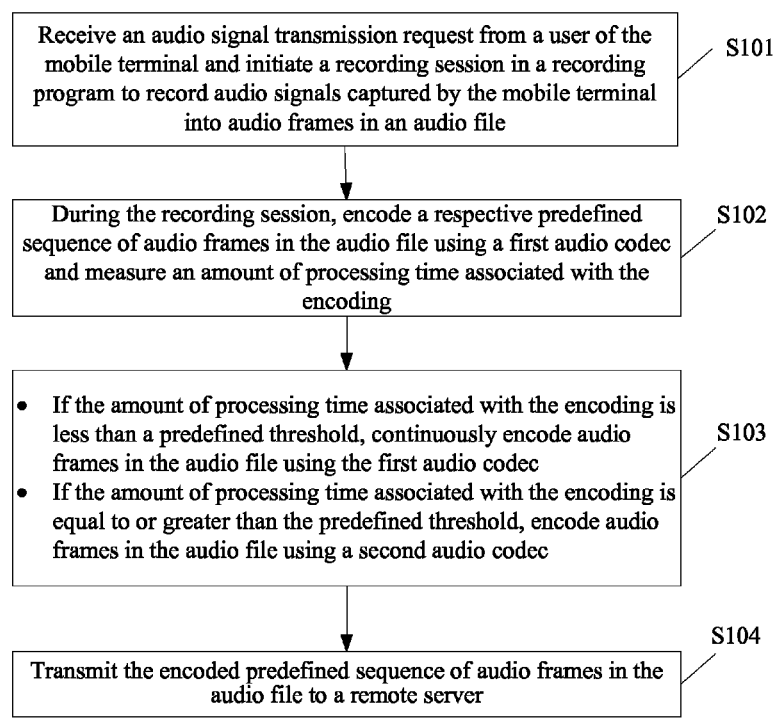
FIG. 1 is a flowchart illustrative of a method for audio encoding and transmission by a mobile terminal in accordance with some embodiments of the current invention.

FIG. 1 is a flowchart illustrative of a method for audio encoding and transmission by a mobile terminal in accordance with some embodiments of the current invention. As shown by step S101 in FIG. 1, the mobile terminal may receive an audio signal transmission request from a user of the mobile terminal and initiate a recording session in a recording program to record audio signals captured by the mobile terminal into audio frames in an audio file. Step S102 shows that during the recording session, the mobile terminal may encode a respective predefined sequence of audio frames in the audio file using a first audio codec and measure an amount of processing time associated with the encoding. As shown by Step 103, if the amount of processing time associated with the encoding is less than a predefined threshold, the mobile terminal may continuously encode audio frames in the audio file using the first audio codec; if the amount of processing time associated with the encoding is equal to or greater than the predefined threshold, the mobile terminal may encode audio frames in the audio file using a second audio codec. Step 104 shows that the mobile terminal may transmit the encoded predefined sequence of audio frames in the audio file to a remote server.

Figure 2:
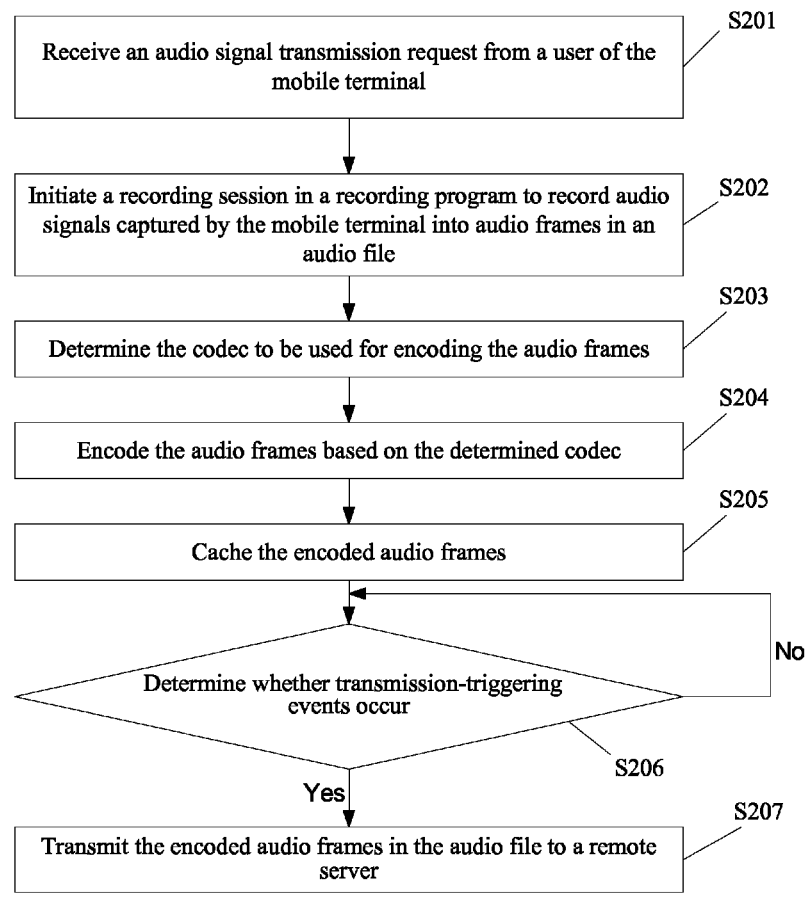
FIG. 2 is a flowchart illustrative of a method for audio encoding and transmission by a mobile terminal in accordance with some embodiments of the current invention, providing more details regarding the transmission process.

FIG. 2 is a flowchart illustrative of a method for audio encoding and transmission by a mobile terminal in accordance with some embodiments of the current invention, providing more details regarding the transmission process.

As shown by step S201 of FIG. 2, the mobile terminal may receive an audio signal transmission request from a user of the mobile terminal. The mobile terminal may be any device, such as but not limited to smart phones, tablet computers, personal digital assistants (PDAs), e-book readers, vehicle-associated terminals, and digital photo frames. It should also be noted that mobile terminal is used here as an example and the process and devices herein disclosed also apply to devices such as laptop and desktop computers. The audio signal transmission request refers to inputs, commands, and signals from the user of the mobile terminal to record, compile, encode, store, edit, and/or transmit audio signals. In addition to the user, the audio signal transmission request may be sent out by other computing devices such as a server.

The mobile terminal may receive the transmission request through the client-side of an application program installed on the mobile terminal, wherein the application program may include but not limited to: an instant messaging (IM) program, a live chat program, and a social networking program. A user of the mobile terminal may provide inputs through the user interfaces of the client-side of the program. As to the steps conducted by the mobile terminal as described below, the mobile terminal may carry out such steps through the client-side of the application program.

Referring to FIG. 2, Step S202 shows that the mobile terminal may initiate a recording session. In some embodiments, the initiation is carried out by the client-side of an application program such as an IM program, which may be used as an example. The IM program may not incorporate a recording function, wherein the IM program may connect to a recording program and initiate the recording session in the recording program. For example, in a mobile terminal using the Android® operating system, the recording program may be a default Android recording program. In some embodiments, the client-side of the IM program may provide a user interface which allows the user to press a button to send an audio transmission request and initiate a recording session. For instance, the user interface may include a "Press-to-talk" button that may be used by the user. When the IM program receives the audio transmission request, the IM program may connect to a recording application programming interface (API) in the mobile terminal, which may be used to carry out the recording session. In some embodiments, the program (e.g. IM program) that receives the audio signal transmission request may also serve as the recording program and the initiation of the recording session is conducted within the same program.

The recording session is used to record audio signals captured by the mobile terminal into audio frames in an audio file. The recorder component of the mobile terminal is used to capture the original audio signals and the recording program may record, compile, and/or convert such audio signals into audio frames in an audio file. The audio file may be any format and the suitable format for the audio file and audio frames may vary. In some embodiments, the recording session may include: the recording program conducts digitization, sampling, and quantization of the analog audio data from the user or other sources, forming at least one audio frame; the least one audio frame may constitute an audio file having specific formats such as the PCM (pulse-code modulation) format.

An optional step may be included in the current process: the application program (e.g. IM program) receiving the audio transmission request may collect the audio frames from the recording program. Such a step is unneeded when the initiation and recording steps are conducted in the same program. The collection of audio frames from the recording program may be conducted in a frame-by-frame manner—whenever an audio frame is produced, it is collected, or by a batch-collection process—when certain number of audio frames are produced, these frames are collected together.

Referring to FIG. 2, Step S203 shows that the mobile terminal may determine the codec to be used for encoding the audio frames. To balance encoding integrity and encoding speed, the codec that is used may be changed or adjusted from time to time. In some embodiments, the encoding of the audio frames may be started instantaneously when the recording session begins. The encoding and transmission of the audio frame may be carried out almost entirely during the recording session. However, it should be noted that such simultaneity is not a requirement. Since the terminal may only encode the audio frames that have been created, there is likely to be a delay for the encoding and transmission and some parts of the encoding and transmission may be completed after the recording session is finished. In an alternatively approach, the encoding only starts after a delay that is set by the user or the program conducting the encoding.

The codec may be any kind of codec that may be used for audio frame encoding. In some embodiments, floating-point adaptive multi-rate (AMR) audio codec may be used; in some other embodiments, fixed-point AMR audio codec may be used. In general, floating-point AMR provides higher audio integrity during encoding but requires more system resources, such as central processing unit (CPU) capacity and memory occupancy. On the other hand, fixed-point AMR requires less system resources but is not as effective as the floating-point AMR audio codec in preserving audio integrity. In the current disclosure, floating-point AMR audio codec and the fixed-point AMR audio codec may be used as examples for two types of codec that may be selected by the mobile terminal to encode the audio frames and provide a balanced approach to maintain high audio quality and smooth operation. When there are enough system resources available, preferably the floating-point AMR audio codec is uses; and when system resources are limited, the fixed-point AMR audio codec is preferably used.

The mobile terminal may determine the codec to be used for encoding the audio frame by measuring the encoding time. The details of the determination process may be described below in FIGS. 3 and 4. Referring to Step S204 of FIG. 2, the mobile terminal may encode the audio frames based on the determined codec. It should also be noted that there may be some variations as to which codec is used for the determination process, how many audio frames may be encoded after the codec is determined, and how often does the mobile terminal to change or adjust the codec.

Referring to FIG. 2, Step S205 shows that the mobile terminal may cache the encoded audio frames.

As shown by Step S206 of FIG. 2, the mobile terminal may determine whether transmission-triggering events occur. The transmission-triggering events may be any event or conditions that may or may not be satisfied. In some embodiments, the transmission-triggering event may not involve the cached audio frames from step S205. However, in some embodiments, the transmission-triggering event may be based on the cached audio frames. For example, the transmission-triggering event occurs when the data size of the cached audio frames accumulate over a threshold, e.g. 2 kb, 3 kb, etc, or the transmission-triggering event occurs when the playtime of the cached audio frames are longer than a threshold, e.g. 1 second.

As shown in FIG. 2, if the transmission-triggering event does not occur, the mobile terminal may not transmit the encoded audio frames. On the other hand, if the transmission-triggering event occurs, the mobile terminal may transmit the encoded audio frames in the audio file to a remote server. The thresholds may be set or scheduled by the programs and may be based on factors such as historical encoding performance, the system capacity (e.g. CPU speed and memory size) of the mobile terminal, network capacity, user requirement of audio integrity, and/or foreseeable workload. The remote server may be any computing device that provides processing and networking capabilities.

For example, the cached encoded audio frames may be measured by data size. Suppose every cached encoded audio frame is 1 kb and the threshold is set at 2 kb, the mobile terminal may detect that 2 kb of encoded audio frames are cached and may start the transmission. Alternatively, the cached encoded audio frames may be measured by the playing time of the frames. Suppose the playing time of the first three audio frames are 0.3 s, 0.5 s, and 0.4 s, respectively and the threshold is set at 1 second. Then after the first three audio frames are cached, the mobile terminal may detect that the accumulated playing time is greater than 1 second and transmit all three audio frames to the server.

In the present invention, when the mobile terminal receives the audio transmission request, it can initiate a recording session to record the audio signals captured by the mobile terminal into audio frames in an audio file. The audio frames are then encoded with the proper codec, cached, and transmitted to a remote server. The current invention thus realizes the process of recording the audio file while it sending out, reducing the audio transmission time delay, preserving audio integrity, effectively improving the audio transmission efficiency and satisfying the demands of users.

Figure 3:
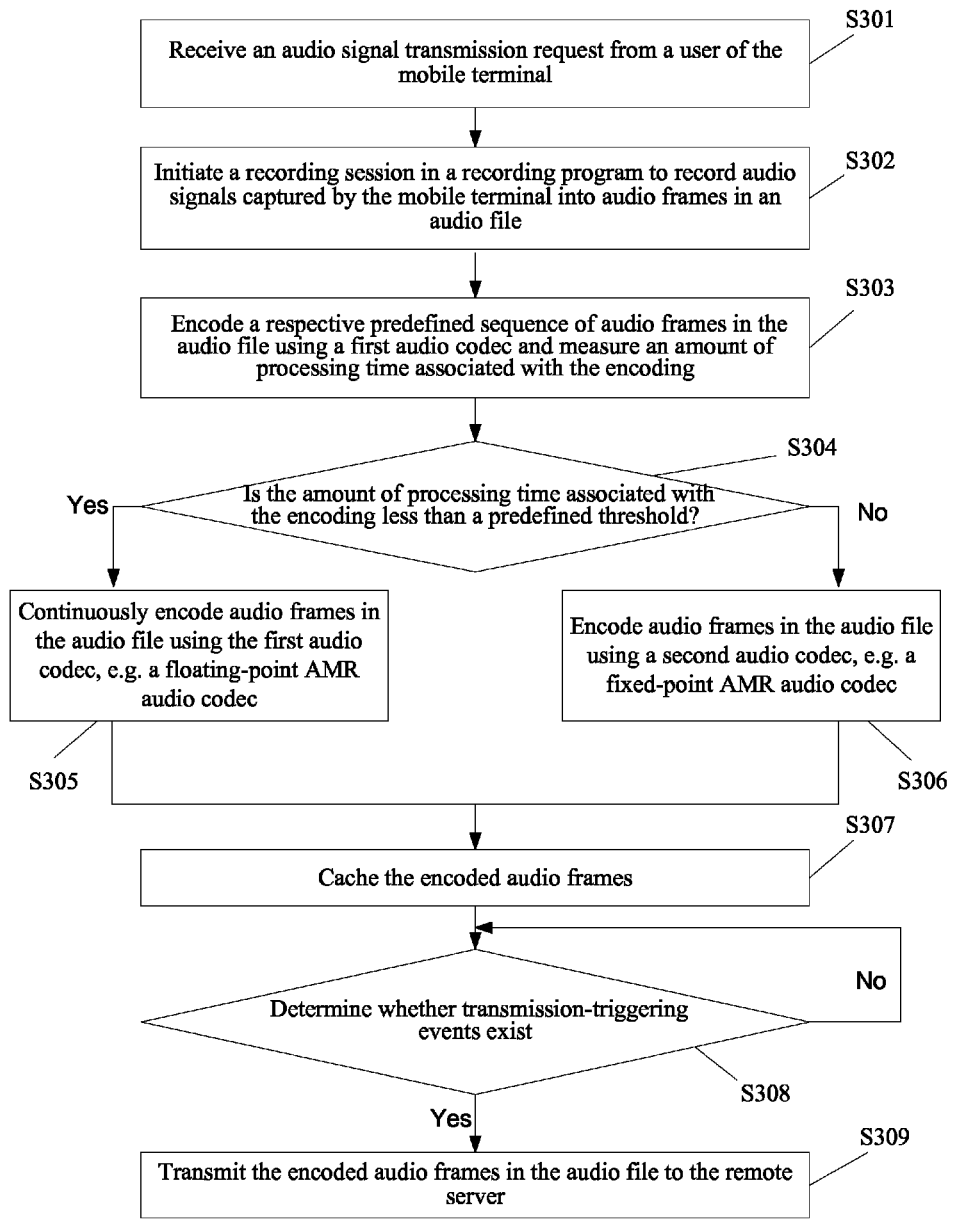
FIG. 3 is a flowchart illustrative of a method for audio encoding and transmission by a mobile terminal in accordance with some embodiments of the current invention, providing more details regarding the encoding process.

FIG. 3 is a flowchart illustrative of a method for audio encoding and transmission by a mobile terminal in accordance with some embodiments of the current invention, providing more details regarding the encoding process. Here, the steps of S301 and S302 are similar to the steps S201 and S202 of FIG. 2. The steps S303, S304, S305, and S306 provide an example for the process of determining the audio codec that may be used to encode the audio frames.

As shown in step S303, the mobile terminal may encode a respective predefined sequence of audio frames in the audio file using a first audio codec. The respective predefined sequence of audio frames may be the initial or subsequent sequence of audio frames of the audio file. The sequence may be defined by the program in the mobile terminal regarding the number of audio frames that are encoded and/or the start position of the sequence. The respective predefined sequence of audio frames is used to test the encoding speed and determine the codec for encoding the later sequences or the entire audio file. In some embodiments, the first audio codec may be the floating-point AMR audio codec, which may preserve more audio integrity but also consume more resources. In such cases, the goal is to conduct the test encoding with the codec that produces higher quality and continue with the same codec or switch to a codec that results in lower quality but consumes less resources, depending on the test encoding results. However, it should also be noted that in some embodiments, the first encoding codec may be any other codec such as the fixed-point AMR audio codec. In such cases, the basic goal is to save system resource and maintain smooth operation.

Referring to S303 of FIG. 3, the mobile terminal may also measure an amount of processing time associated with the encoding of the respective predefined sequence of audio frames. In some embodiments, the measurement may be carried out by the program conducting the encoding.

As shown by step S304 of FIG. 3, the mobile terminal may determine whether the amount of processing time associated with encoding the respective predefined sequence of audio frames is less than a predefined threshold. If the processing time is less than the threshold, the first audio codec is chosen and the mobile terminal continuously encode audio frames in the audio file using the first audio codec, e.g. the floating-point AMR audio codec, as indicated by step S305. On the other hand, if the processing time is equal or greater than the threshold, the mobile terminal encodes audio frames in the audio file using a second audio codec, e.g. the fixed-point AMR audio codec.

For example, suppose that audio file contains 10 audio frames and the threshold is one second. After the recording application starts to record the audio signals captured by the mobile terminal into audio frames, the first to third frames are collected and used as the respective predefined sequence by the program conducting the encoding, e.g. an instant message (IM) program. With a first audio codec, suppose the processing time for encoding the first frame is 0.2 s, the processing time for encoding the second frame is 0.8 s, and the processing time for encoding the third frame data is 0.2 s. Then the overall processing time may be (0.2+0.8+0.2)=1.2 s, which is more than the one second threshold, steering the IM program to switch to use the second audio codec. On the other hand, if the processing time for the three frames are: 0.1, 0.2, and 0.3 s, the overall time is 0.6 s, which is less than the threshold and the mobile terminal may continue encoding the audio frame with the first audio codec.

The threshold time may be set or schedule by the program conducting the encoding, based on factors such as historical encoding performance, the system capacity (e.g. CPU speed and memory size) of the mobile terminal, network capacity, user requirement of audio integrity, and/or foreseeable workload. The determination process may also be based on an average time for encoding each frame in the respective predefined sequence of audio frames, wherein the threshold is set to target the average time. In that case, suppose the threshold is 0.5 second and the processing time for the three frames are 0.2 s, 0.8 s, and 0.2 s, respectively, the average encoding is calculated as (0.2+0.8+0.2)/3=0.4 s, less than the preset time threshold value 0.5 second, and the mobile terminal may determine that the first audio codec, e.g. the floating-point AMR audio codec, should be used.

As indicated above, the respective predefined sequence may be any sequence of audio frames in the audio file. In some embodiments, the respective predefined sequence may start from the first audio frame and after the encoding the respective predefined sequence, the mobile terminal may continue encoding the rest of the audio frames using the same codec for the respective predefined sequence or use the same audio codec for the entire audio file. Alternatively, the mobile terminal may switch to the second audio codec and use it for the rest of the audio frames or the all the audio frames in the audio file. On the other hand, the respective predefined sequence may start from positions other than the first audio frame of the audio file. The mobile terminal may use the first or second audio codec to encode the respective predefined sequence of audio frames, and then determines which audio codec should be used to encode the rest of the audio frames.

As shown in steps S307, S308, and S309 of FIG. 3, the mobile terminal may cache the encoded audio frames, determine whether the transmission-triggering events exist, and transmit the encoded audio frames in the audio file to a remote server. These steps are largely similar to steps S205, S206, and S207 of FIG. 2. In addition, the transmission of the encoded audio frames may include all the cached encoded audio frames or may be more limited. For example, the mobile terminal may transmit only the predefined sequence of encoded audio frames to the remote server.

Figure 4:
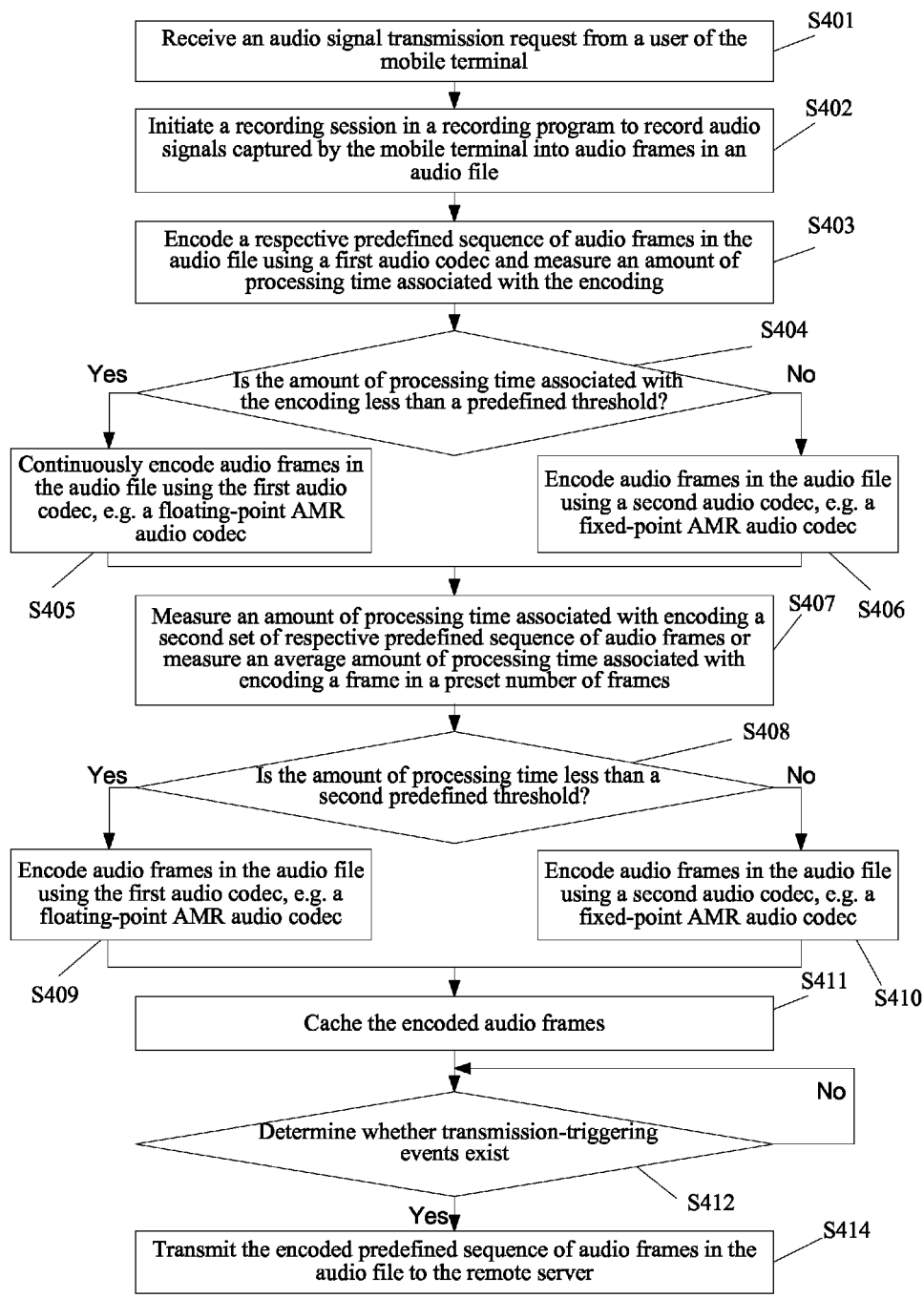
FIG. 4 is a flowchart illustrative of a method for audio encoding and transmission by a mobile terminal in accordance with some embodiments of the current invention, providing more details regarding the encoding process, particularly the codec determination process.

FIG. 4 is a flowchart illustrative of a method for audio encoding and transmission by a mobile terminal in accordance with some embodiments of the current invention, providing more details regarding the encoding process, particularly the codec determination process. Steps S401, S402, S403, S404, S405, and S406 of FIG. 4 are largely similar as the steps S301, S302, S303, S304, S305, and S306 of FIG. 3. Referring to FIG. 4, steps S407, S408, S409, and S410 provide examples for addition processes that may be used to further optimize codec selection and facilitate encoding.

As shown in step S407, in some embodiments, the mobile terminal may measure an amount of processing time associated with encoding a second set of respective predefined sequence of audio frames. Also as shown in step S407, in some embodiments, the mobile terminal may measure an average amount of processing time associated with encoding a frame in a preset number of frames. These approaches may be similar to what is illustrated in the step S403 and may be conducted after a preset time interval from the last codec selection or after encoding a preset number of audio frames after the last codec selection. In general, in steps S407-410, the mobile terminal make another attempt to adjust to the most suitable audio codec.

The measurement of encoding may vary, as indicated in step S407. For example, the mobile terminal may measure the total or average processing time of encoding a second set of respective predefined sequence of audio frames; the mobile terminal may measure the total or average processing time to encode each frame by the last used codec; the mobile terminal may also measure the total or average processing time to encode all the audio frames in the audio file that have been encoded. The key goal here is to provide a parameter that may be used to evaluate the encoding performance by the mobile terminal to decide what audio codec should be used for the rest of the audio frame in the audio file or until another determination process is carried out.

As shown in steps S408 to S410, the mobile terminal may determine if the amount of processing time is less than a second predefined threshold; if the processing time is less than the second predefined threshold, the mobile terminal may encode audio frames in the audio file using the first audio codec, e.g. the floating-point AMR audio codec; if the processing time is equal to or more than the second threshold, the mobile terminal may encode audio frames in the audio file using the second audio codec, e.g. the fixed-point AMR audio codec.

As indicated above, the particular measurement of processing time may vary. Accordingly, the threshold time should vary with the selection of the measurement. The threshold may be based on factors such as historical encoding performance, the system capacity (e.g. CPU speed and memory size) of the mobile terminal, network capacity, user requirement of audio integrity, and/or foreseeable workload.

Referring to FIG. 4, steps S411, S412, and S414 are similar to the steps S307, S308, and S309 of FIG. 3.

It should also be noted that during the encoding process, there may be one, two, or more determination processes (e.g. steps S403-S406 or steps S407-S410) regarding the audio codec. The number of determination processes or the intervals between the determination processes may be preset or scheduled by the encoding program.

The process shown in FIG. 4 may be further illustrated by an example. After receiving an audio signal transmission request from the user—the user pressing the "press to talk" button on the user interface of an IM program—the IM program in the mobile terminal may initiate a recording session in a recording program to record audio signals captured by the mobile terminal into audio frames in an audio file. The IM program may then start to encode the audio frames after collecting the audio frames from the recording program. The IM program predefines the first three audio frames as the respective predefined sequence and uses the floating-point AMR audio codec to encode the first three frames. The processing time associated with encoding the first three audio frames is measured to be 0.2 s, 0.8 s, and 0.2 seconds, respectively. The predefined threshold time for the average processing time is set at 1 second, wherein the average time of encoding the respective predefined sequence of audio frames is (0.2+0.8+0.2)/3=0.4 s, which is less than the threshold. Thus, the mobile terminal continues to encode the audio frames using the floating-point AMR audio codec. After encoding an additional 12 audio frames (audio frames 4-15 of the audio file), the mobile terminal starts another determination process and encodes 3 audio frames (audio frames 16-18) using the floating-point AMR audio codec. The average processing time for these 3 audio frames is 0.8 s and the second threshold is set at 0.5 s. This time, the processing time is more than the second threshold and the mobile terminal switches to the fixed-point AMR audio codec for further encoding. The IM program at the same time caches all the encoded audio frames. The playing time for the first four audio frames are 0.2 s, 0.3 s, 0.4 s, and 0.3 second, while the threshold is set to be 1 second. After the first four encoded audio frames are cached, the transmission trigger event occurs and the four audio frames are transmitted by the mobile terminal to a remote server.

FIGS. 5-10 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the methods.

Figure 5:
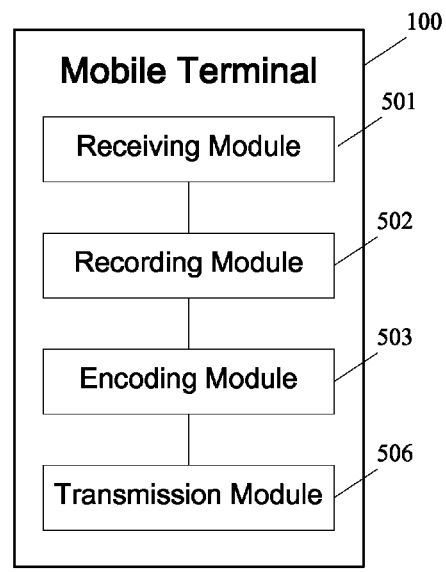
FIG. 5 is a block diagram illustrative of a mobile terminal comprising modules configured to encode and transmit audio signals in accordance with some embodiments of the current invention.

FIG. 5 is a block diagram illustrative of a mobile terminal 100 comprising modules configured to encode and transmit audio signals in accordance with some embodiments of the current invention. The terminal 100 may include one or more processors; memory; and one or more programs modules stored in the memory and configured for execution by the one or more processors, the one or more program modules including: a receiving module 501 configured to receive an audio signal transmission request from a user of the mobile terminal; a recording module 502 configured to initiate a recording session in a recording program to record audio signals captured by the mobile terminal into audio frames in an audio file; an encoding module 503 having a codec determination unit and an encoding unit, wherein: during the recording session: the encoding unit is configured to encode a respective predefined sequence of audio frames in the audio file using a first audio codec, the codec determination unit is configured to measure an amount of processing time associated with the encoding, if the amount of processing time associated with the encoding is less than a predefined threshold, the encoding unit is configured to continuously encode audio frames in the audio file using the first audio codec; if the amount of processing time associated with the encoding is equal to or greater than the predefined threshold, the encoding unit is configured to encode audio frames in the audio file using a second audio codec; and a transmission module 506 configured to transmit the encoded predefined sequence of audio frames in the audio file to a remote server.

Figure 6:
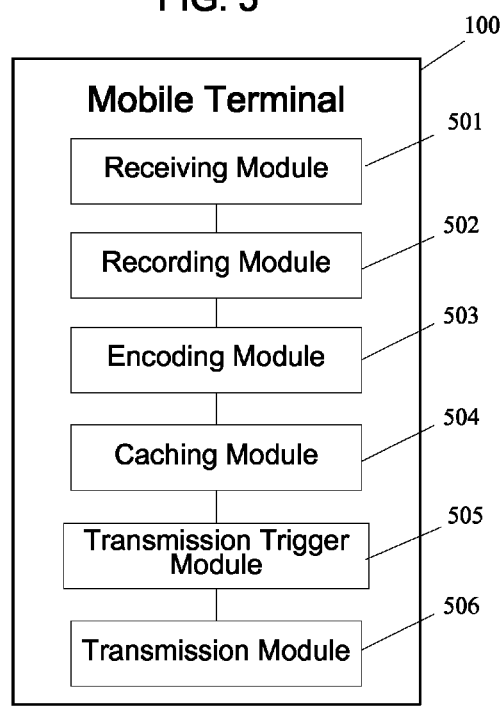
FIG. 6 is a block diagram illustrative of a mobile terminal comprising modules configured to encode and transmit audio signals in accordance with some embodiments of the current invention, providing more details for the modules.

FIG. 6 is a block diagram illustrative of a mobile terminal 100 comprising modules configured to encode and transmit audio signals in accordance with some embodiments of the current invention, providing more details for the modules. In addition to the modules illustrated in FIG. 5, the mobile terminal 100 may further comprise a caching module 504 and a transmission trigger module 505, wherein the caching module 504 is configured to cache the encoded predefined sequence of audio frames before transmission; the transmission trigger module 505 is configured to determine whether the cached audio frames exceed a threshold; and the transmission module 506 is further configured to transmit the encoded predefined sequence of audio frames starts when the cached audio frames exceed the threshold.

Figure 7:
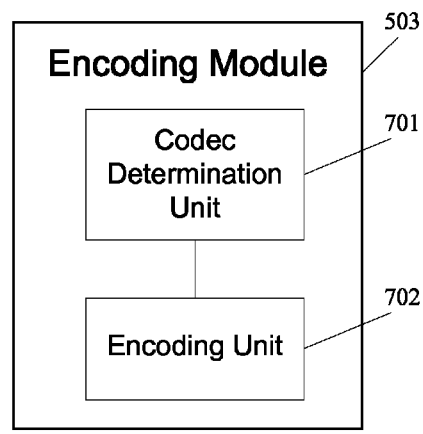
FIG. 7 is a block diagram illustrative of an encoding module in accordance with some embodiments of the current invention.
Figure 8:
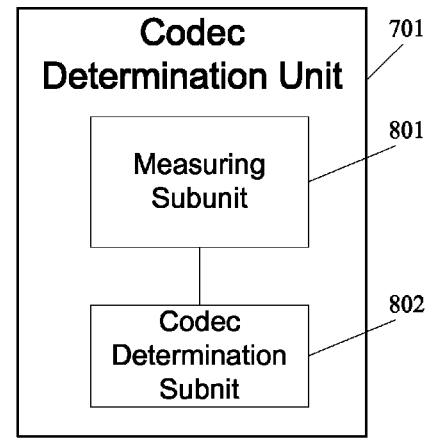
FIG. 8 is a block diagram illustrative of a codec determination unit in accordance with some embodiments of the current invention.

FIG. 7 is a block diagram illustrative of an encoding module 503 in accordance with some embodiments of the current invention, wherein the encoding module 503 may comprise a codec determination unit 701 and an encoding unit 702. FIG. 8 is a block diagram illustrative of the codec determination unit 701 in accordance with some embodiments of the current invention, wherein the codec determination unit 701 may comprise a measuring subunit 801 and a codec determination subunit 802.

In some embodiments, the encoding unit 702 is configured to encode a respective predefined sequence of audio frames in the audio file using a first audio codec, the measuring subunit 801 of the codec determination unit 701 is configured to measure an amount of processing time associated with the encoding. If the codec determination subunit 802 determines that the amount of processing time associated with the encoding is less than a predefined threshold, the encoding unit 702 is configured to continuously encode audio frames in the audio file using the first audio codec. If the codec determination subunit 802 determines that the amount of processing time associated with the encoding is equal to or greater than the predefined threshold, the encoding unit 702 is configured to encode audio frames in the audio file using a second audio codec. As indicated above, the first audio codec may be a floating-point adaptive multi-rate (AMR) audio codec and the second audio codec may be a fixed-point AMR audio codec.

In some embodiments, during the recording session, after a preset time interval, the encoding unit 702 may be further configured to continuously encode a second set of respective predefined sequence of audio frames in the audio file. The measuring subunit 801 of the codec determination unit 701 may be further configured to measure an amount of processing time associated with encoding the second set of respective predefined sequence. If the codec determination subunit 802 of the codec determination unit 701 determines that the amount of processing time associated with encoding the second set of respective predefined sequence is less than a second predefined threshold, the encoding unit 702 is further configured to encode audio frames in the audio file using the first audio codec. If the codec determination subunit 802 of the codec determination unit 701 determines that the amount of processing time associated with encoding the second set of respective predefined sequence is equal to or greater than the second predefined threshold, the encoding unit 702 is further configured to encode audio frames in the audio file using the second audio codec.

In some embodiments, during the recording session, after a preset number of frames are encoded, the measuring subunit 801 of the codec determination unit 701 is further configured to measure an average amount of processing time associated with encoding a frame in the preset number of frames. If the codec determination subunit 802 of the codec determination unit 701 determines that the average amount of processing time associated with encoding a frame in the preset number of frames is less than a second predefined threshold, the encoding unit 702 is further configured to continue to encode audio frames in the audio file using the first audio codec. If the codec determination subunit 802 of the codec determination unit 701 determines that the average amount of processing time associated with encoding a frame in the preset number of frames is equal to or greater than the second predefined threshold, the encoding unit 702 is further configured to continue to encode audio frames in the audio file using the second audio codec.

Figure 9:
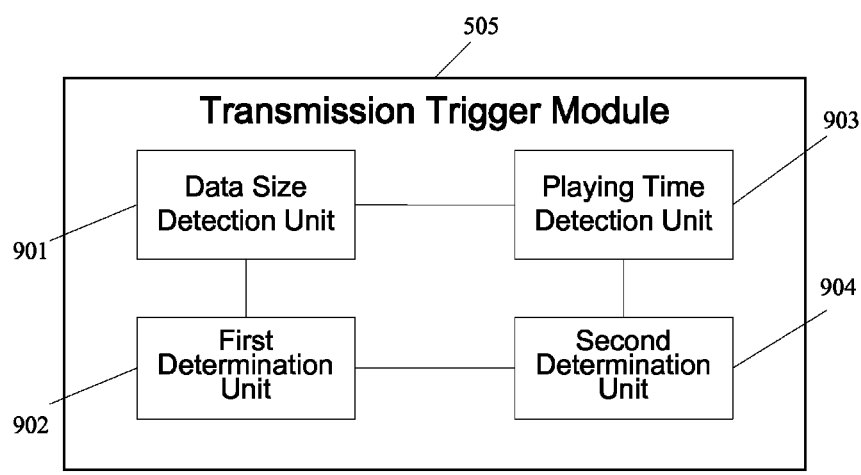
FIG. 9 is a block diagram illustrative of a transmission trigger module in accordance with some embodiments of the current invention.

FIG. 9 is a block diagram illustrative of a transmission trigger module 505 in accordance with some embodiments of the current invention. As shown in FIG. 9, the transmission trigger module 505 may comprise a data size detection unit 901, a first determination unit 902, a playing time detection unit 903, and a second determination unit 904. As indicated above, the transmission trigger module 505 is configured to determine whether the cached audio frames exceed a threshold. In some embodiments, the data size determination unit 901 is configured to measure the data size of the cached audio frames and the first determination unit 902 is configured to determine whether the measurement exceeds the threshold, which refers to data size, e.g. 10 kb. In some embodiments, the playing time detection unit 903 is configured to measure the playing time of the audio frames and the second determination unit 904 is configured to determine whether the measure exceeds the threshold, which refers to a time period, e.g. 2 seconds.

Figure 10:
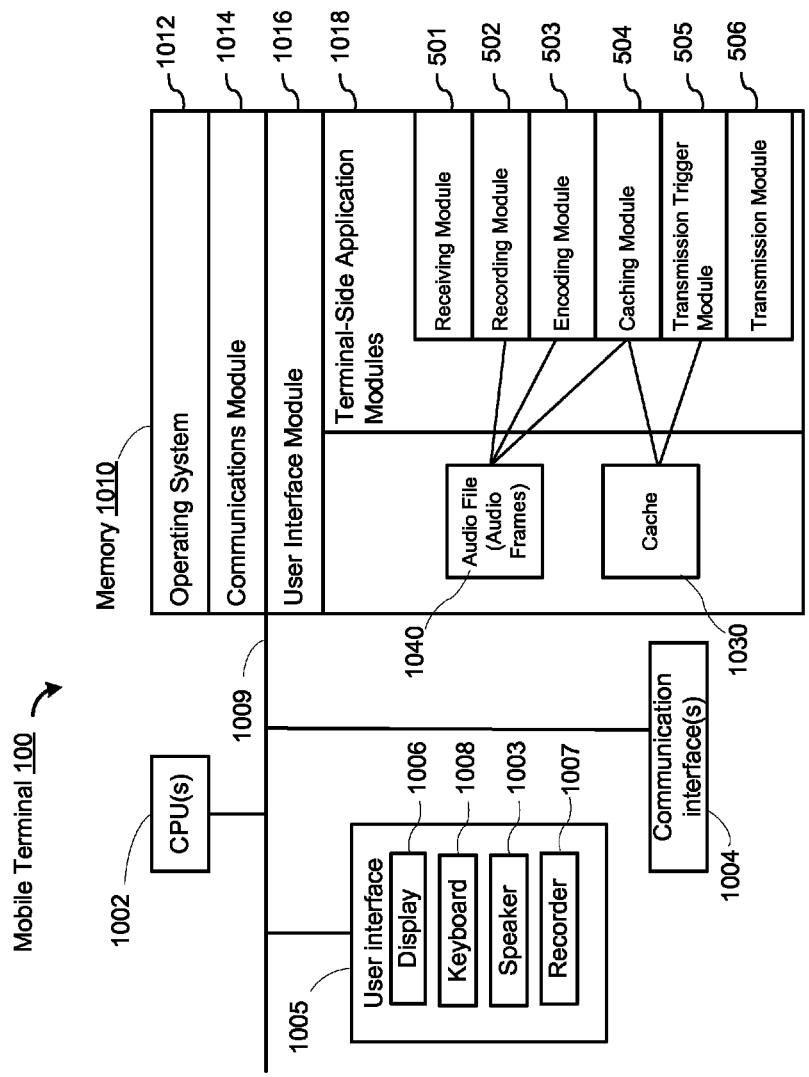
FIG. 10 is a block diagram of a mobile terminal in accordance with some embodiments of the current invention.

FIG. 10 is a block diagram of a mobile terminal in accordance with some embodiments of the current invention. The exemplary mobile terminal 100 typically includes one or more processing units (CPU's) 1002, one or more network or other communications interfaces 1004, memory 1010, and one or more communication buses 1009 for interconnecting these components. The communication buses 1009 may include circuitry (sometimes called a chipset) that interconnects and controls communications between system components. The mobile terminal 100 may include a user interface 1005, for instance, a display 1006, a keyboard 1008, a speaker 1003, and a recorder 1007. When the mobile terminal 100 is a smart phone or tablet, the user interface 1005 may include a touch screen, which is both a display and an input device. Memory 1010 may include high speed random access memory and may also include non-volatile memory, such as one or more magnetic disk storage devices. Memory 1010 may include mass storage that is remotely located from the CPU's 1002. In some embodiments, memory 1010 stores the following programs, modules and data structures, or a subset or superset thereof:

- an operating system 1012 that includes procedures for handling various basic system services and for performing hardware dependent tasks;
- a network communication module 1014 that is used for connecting the mobile terminal 101 to the server, the mobile terminals, and/or other computers via one or more communication networks (wired or wireless), such as the Internet, other wide area networks, local area networks, metropolitan area networks, and so on;
- a user interface module 1016 configured to receive user inputs through the user interface 1005;
- and a number of terminal-side application modules 1018 including the following:
- a receiving module 501 configured to receive an audio signal transmission request from a user of the mobile terminal;
- a recording module 502 configured to initiate a recording session in a recording program to record audio signals captured by the mobile terminal into audio frames in an audio file 1040;
- an encoding module 503 having a codec determination unit and an encoding unit, wherein: during the recording session: the encoding unit is configured to encode a respective predefined sequence of audio frames in the audio file 1040 using a first audio codec, the codec determination unit is configured to measure an amount of processing time associated with the encoding, if the amount of processing time associated with the encoding is less than a predefined threshold, the encoding unit is configured to continuously encode audio frames in the audio file 1040 using the first audio codec; if the amount of processing time associated with the encoding is equal to or greater than the predefined threshold, the encoding unit is configured to encode audio frames in the audio file 1040 using a second audio codec;
- a caching module 504 configured to cache the encoded predefined sequence of audio frames before transmission, wherein the cached audio frames are stored in the cache 1030;
- a transmission trigger module 505 configured to determine whether the cached audio frames exceed a threshold; and
- a transmission module 506 configured to transmit the encoded predefined sequence of audio frames in the audio file 1040 to a remote server.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for transferring audio signals from a mobile terminal to a remote server, the method comprising:
    at the mobile terminal having one or more processors and memory storing programs executed by the one or more processors,
        receiving an audio signal transmission request from a user of the mobile terminal;
        initiating a recording session in a recording program to record audio signals captured by the mobile terminal into audio frames in an audio file;
        during the recording session:
            encoding a respective predefined sequence of audio frames in the audio file using a first audio codec and measuring an amount of processing time associated with the encoding;
            if the amount of processing time associated with the encoding is less than a predefined threshold, continuously encoding remaining audio frames in the audio file using the first audio codec;
            if the amount of processing time associated with the encoding is equal to or greater than the predefined threshold, encoding remaining audio frames in the audio file using a second audio codec;
            caching the encoded predefined sequence of audio frames and the remaining audio frames in the memory; and
            transmitting the encoded predefined sequence of audio frames and the encoded remaining audio frames in the memory to the remote server after a play time of the cached audio frames exceeds a predefined time period.

2. The method of claim 1, wherein:
the first audio codec is a floating-point adaptive multi-rate (AMR) audio codec.

3. The method of claim 1, wherein:
the second audio codec is a fixed-point AMR audio codec.

4. The method of claim 1, further comprising:
during the recording session:
    after a preset time interval, continuously encoding a second set of respective predefined sequence of audio frames in the audio file and measuring an amount of processing time associated with encoding the second set of respective predefined sequence;
    if the amount of processing time associated with encoding the second set of respective predefined sequence is less than a second predefined threshold, encoding a second set of remaining audio frames in the audio file using the first audio codec; and
    if the amount of processing time associated with encoding the second set of respective predefined sequence is equal to or greater than the second predefined threshold, encoding a second set of remaining audio frames in the audio file using the second audio codec.

5. The method of claim 1, further comprising:
during the recording session:
    after a preset number of frames are encoded, measuring an average amount of processing time associated with encoding a frame in the preset number of frames;
    if the average amount of processing time associated with encoding a frame in the preset number of frames is less than a second predefined threshold, continuing to encode a third set of remaining audio frames in the audio file using the first audio codec; and
    if the average amount of processing time associated with encoding a frame in the preset number of frames is equal to or greater than the second predefined threshold, continuing to encode a third set of remaining audio frames in the audio file using the second audio codec.

6. The method of claim 1, wherein:
the step of transmitting the encoded predefined sequence of audio frames and the encoded remaining audio frames starts when the cached audio frames exceed a threshold.

7. A computer system comprising a mobile terminal, the mobile terminal having:
    one or more processors;
    memory; and
    one or more programs modules stored in the memory and configured for execution by the one or more processors, the one or more program modules including:
        a receiving module configured to receive an audio signal transmission request from a user of the mobile terminal;
        a recording module configured to initiate a recording session in a recording program to record audio signals captured by the mobile terminal into audio frames in an audio file;

an encoding module having a codec determination unit and an encoding unit, wherein:
during the recording session:
the encoding unit is configured to encode a respective predefined sequence of audio frames in the audio file using a first audio codec,
the codec determination unit is configured to measure an amount of processing time associated with the encoding,
if the amount of processing time associated with the encoding is less than a predefined threshold, the encoding unit is configured to continuously encode remaining audio frames in the audio file using the first audio codec,
if the amount of processing time associated with the encoding is equal to or greater than the predefined threshold, the encoding unit is configured to encode remaining audio frames in the audio file using a second audio codec; and
a caching module configured to cache the encoded predefined sequence of audio frames and the remaining audio frames in the memory;
a transmission module configured to transmit the encoded predefined sequence of audio frames and the encoded remaining audio frames in the memory to a remote server after a play time of the cached audio frames exceeds a predefined time period.

8. The computer system of claim 7, wherein:
the first audio codec is a floating-point adaptive multi-rate (AMR) audio codec.

9. The computer system of claim 7, wherein:
the second audio codec is a fixed-point AMR audio codec.

10. The computer system of claim 7, wherein:
during the recording session:
after a preset time interval, the encoding unit is further configured to continuously encode a second set of respective predefined sequence of audio frames in the audio file;
the codec determination unit is further configured to measure an amount of processing time associated with encoding the second set of respective predefined sequence;
if the amount of processing time associated with encoding the second set of respective predefined sequence is less than a second predefined threshold, the encoding unit is further configured to encode a second set of remaining audio frames in the audio file using the first audio codec; and
if the amount of processing time associated with encoding the second set of respective predefined sequence is equal to or greater than the second predefined threshold, the encoding unit is further configured to encode a second set of remaining audio frames in the audio file using the second audio codec.

11. The computer system of claim 7, wherein:
during the recording session:
after a preset number of frames are encoded, the codec determination unit is further configured to measure an average amount of processing time associated with encoding a frame in the preset number of frames;
if the average amount of processing time associated with encoding a frame in the preset number of frames is less than a second predefined threshold, the encoding unit is further configured to continue to encode a third set of remaining audio frames in the audio file using the first audio codec; and if the average amount of processing time associated with encoding a frame in the preset number of frames is equal to or greater than the second predefined threshold, the encoding unit is further configured to continue to encode a third set of remaining audio frames in the audio file using the second audio codec.

12. A non-transitory computer readable storage medium having stored therein one or more instructions, which, when executed by a mobile terminal, cause the mobile terminal to:
receive an audio signal transmission request from a user of the mobile terminal;
initiate a recording session in a recording program to record audio signals captured by the mobile terminal into audio frames in an audio file;
during the recording session:
encode a respective predefined sequence of audio frames in the audio file using a first audio codec and measure an amount of processing time associated with the encoding;
if the amount of processing time associated with the encoding is less than a predefined threshold, continuously encode remaining audio frames in the audio file using the first audio codec;
if the amount of processing time associated with the encoding is equal to or greater than the predefined threshold, encode remaining audio frames in the audio file using a second audio codec;
cache the encoded predefined sequence of audio frames and the remaining audio frames in the memory; and
transmit the encoded predefined sequence of audio frames and the encoded remaining audio frames in the memory to the remote server after a play time of the cached audio frames exceeds a predefined time period.

13. The non-transitory computer readable storage medium of claim 12, wherein:
the first audio codec is a floating-point adaptive multi-rate (AMR) audio codec.

14. The non-transitory computer readable storage medium of claim 12, wherein:
the second audio codec is a fixed-point AMR audio codec.

15. The non-transitory computer readable storage medium of claim 12, wherein:
during the recording session, the instruction further causes the mobile terminal to:
after a preset time interval, continuously encode a second set of respective predefined sequence of audio frames in the audio file and measure an amount of processing time associated with encoding the second set of respective predefined sequence;
if the amount of processing time associated with encoding the second set of respective predefined sequence is less than a second predefined threshold, encode a second set of remaining audio frames in the audio file using the first audio codec; and
if the amount of processing time associated with encoding the second set of respective predefined sequence is equal to or greater than the second predefined threshold, encode a second set of remaining audio frames in the audio file using the second audio codec.

16. The non-transitory computer readable storage medium of claim 12, wherein:
during the recording session, the instruction further causes the mobile terminal to:

after a preset number of frames are encoded, measure an average amount of processing time associated with encoding a frame in the preset number of frames;

if the average amount of processing time associated with encoding a frame in the preset number of frames is less than a second predefined threshold, continue to encode a third set of remaining audio frames in the audio file using the first audio codec; and if the average amount of processing time associated with encoding a frame in the preset number of frames is equal to or greater than the second predefined threshold, continue to encode a third set of remaining audio frames in the audio file using the second audio codec.

* * * * *